United States Patent [19]

Kitagishi

[11] Patent Number: 4,659,189

[45] Date of Patent: Apr. 21, 1987

[54] ZOOM LENS OF REDUCED TOTAL LENGTH

[75] Inventor: Nozomu Kitagishi, Tokyo, Japan

[73] Assignee: Canon Kabushiki Kaisha

[21] Appl. No.: 672,795

[22] Filed: Nov. 19, 1984

[30] Foreign Application Priority Data

Nov. 25, 1983 [JP] Japan ................................ 58-222605

[51] Int. Cl.$^4$ .............................................. G02B 15/14
[52] U.S. Cl. ................................................... 350/427
[58] Field of Search ......................................... 350/427

[56] References Cited

U.S. PATENT DOCUMENTS 4,468,098 8/1984 Itoh ..................................... 350/427

*Primary Examiner*—John K. Corbin
*Assistant Examiner*—Rebecca D. Gass
*Attorney, Agent, or Firm*—Toren, McGeady and Goldberg

[57] ABSTRACT

In the disclosed zoom lens, a zoom section includes a number of lens units with at least one of the axial spacings between two successive lens units being variable for zooming, and an image forming section of positive power behind the zoom section includes a front lens unit of positive power and a rear lens unit of negative power. The front lens unit includes at least one positive lens, the rear lens unit includes at least one negative lens, and the image forming section satisfies the following conditions, with the power of the entire system taken as unity:

$$\frac{3.5}{Fim} < \phi a < \frac{5}{Fim} \quad (1)$$

$$5.0 < |\phi b| < 7.0, \phi b < 0 \quad (2)$$

$$0.6 < \left|\frac{Rb}{Ra}\right| < 1.0 \quad (3)$$

$$0.1\ Fim < D < 0.4\ Fim \quad (4)$$

where $\phi a$ represents the power of a convergent surface A convex toward the front with its positive power being strongest in the front lens unit, $\phi b$ the power of a divergent surface B concave toward the front with its negative power being strongest in the rear lens unit, Ra and Rb the radii of curvature of the surfaces A and B respectively, D the air-reduced axial distance from the convergent surface A to the divergent surface B, and Fim the focal length of the image forming section.

13 Claims, 18 Drawing Figures

SPHERICAL ABERRATION
SINE CONDITION     ASTIGMATISM     DISTORTION(%)

FIG.10B

SPHERICAL ABERRATION
SINE CONDITION     ASTIGMATISM     DISTORTION(%)

FIG.10C

SPHERICAL ABERRATION
SINE CONDITION     ASTIGMATISM     DISTORTION(%)

ZOOM LENS OF REDUCED TOTAL LENGTH

BACKGROUND OF THE INVENTION

1. Field of the Invention

This invention relates to zoom lenses and more particularly to zoom lenses of reduced total length.

2. Description of the Prior Art

Zoom lenses are very efficient because just one lens can satisfy the need for a great many focal lengths. However, today's zoom lenses generally have too long a total length, and inconvenience photographers using them on cameras. Various attempts have been made to shorten the total length of the zoom lens, for example, (1) by creating a new zoom type that facilitates reduction of the total length; (2) by increasing the refractive power of each unit of the zoom section; and (3) by shortening the total length of the relay system.

The first solution, creation of a new, shorter zoom type, is highly desirable, but still in the developmental stages. The second method is easy to use. However, as the power increases, the required tolerance for the axial misalignment between the moving lens units becomes critical and severe and is thus incompatible with mass production techniques. The third method, when employed in the zoom lens constructed with four lens units having positive, negative, positive and positive powers respectively, from front to rear, utilizes a fourth lens unit or relay system having a front component of positive power and a rear component of negative power. This is the so-called tele type. The shortest value for the distance from the front vertex of the relay system to the focal plane of the entire system heretofor possible with the use of the tele type is as long as 0.8, measured as the ratio of that distance to the focal length of the relay system. Hitherto, there has been no method to achieve a further reduction except to strengthen the refractive power of each of the front positive and rear negative components while sacrificing good balance of the various corrected aberrations.

SUMMARY OF THE INVENTION

An object of the present invention is to provide a zoom lens of reduced total length and particularly to provide an image forming section of reduced total length by the use of which the total length of the zoom lens is reduced.

A second object of the invention is to achieve reduction of the total length of the image forming section without involving any bad deterioration of all aberrations.

A third object of the invention is to provide a method for strengthening the refractive powers of front and rear lens units constituting the image forming section without sacrificing good correction of all aberrations.

A fourth object of the invention is to strengthen the refractive power of each lens unit by controlling that convergent surface of forward convexity which has the largest positive power in the front lens unit of positive refractive power and that divergent surface of forward concavity which has the largest negative power in the rear lens unit of negative refractive power.

DETAILED DESCRIPTION OF THE PREFERRED EMBODIMENTS

The zoom lens according to the invention include a zoom section and a positive image forming lens unit, the zoom section consisting of, for example, a positive lens unit I, a negative lens unit II and a positive lens unit III, and the image forming lens unit corresponding to a lens unit IV. In the image forming lens unit IV are arranged a front unit of positive power and a rear unit of negative power, with the axial air spacing therebetween being longest in the image forming lens unit IV. The front unit includes at least one positive lens, and the rear unit includes at least one negative lens. Convergent surface A of forward convexity which has the largest refractive power in the front unit and divergent surface B of forward concavity which has the largest refractive power in the rear unit satisfy the following conditions:

$$\frac{3.5}{Fim} < \phi a < \frac{5}{Fim} \tag{1}$$

$$5.0 < |\phi b| < 7.0, \phi b < 0 \tag{2}$$

$$0.6 < \left|\frac{Rb}{Ra}\right| < 1.0 \tag{3}$$

$$0.1\ Fim < D < 0.4\ Fim \tag{4}$$

where

Fim is the focal length of the image forming lens units, $\phi a$ is the refractive power of the convergent surface A, $\phi b$ is the refractive power of the divergent surface B, Ra is the radius of curvature of the convergent surface A, Rb is the radius of curvature of the divergent surface B, and D is the air-reduced axial distance from the convergent surface A to the divergent surface B.

The significance of each of the above-stated conditions (1) to (4) have are explained below.

Conditions (1) and (2) set forth ranges of refractive power $\phi a$ and $\phi b$. The radius of curvature of convergent surface A is smallest in the front part of the image forming lens unit IV. The convex curvature of surface A faces towards the front. The radius of curvature of divergent surface B is smallest in the rear part of the unit IV. The convex curvature of the surface B faces towards the rear. Such surfaces A and B produce aberrations which are cancelled out under conditions (3) and (4). The larger the powers $\phi a$ and $|\phi b|$, the stronger the tele type tendency the lens unit IV has, and the shorter the total length becomes. When both of the upper limits are simultaneously exceeded, however, the aberrations which should be cancelled out with each other are increased greatly, whereby the balance of aberrations is made acutely sensitive to deviation of the actual value of the distance from the surface A to the surface B from the ideal value. Therefore, the tolerance within which the front and rear parts are assembled becomes very severe. When the refractive powers $\phi a$ and $|\phi b|$ are decreased below the lower limits, an increase in the total length results. If this increase is compensated by strengthening the curvatures of other surfaces, increasing aberrations are produced from those surfaces, which are difficult to correct.

Conditions (3) and (4) are interrelated with each other in that not only the spherical aberrations the surfaces A and B produce under the conditions (1) and (2), but also the comas and astigmatisms can be cancelled out with each other. When the upper limit of condition (3) is exceeded, the total spherical aberration is undercorrected too much to be corrected by any suitable design of other surfaces. When the lower limit is exceeded, it is left over-corrected as it cannot be corrected by any suitable design of other surfaces.

Given condition (4), cancellation of the spherical aberrations leads to insure that the comas and the astigmatisms are also cancelled out. When the upper limit is exceeded, despite that spherical aberrations are cancelled out, the total coma and the total astigmatism are left over-corrected. When the lower limit is exceeded, they are left under-corrected.

Figure 1:
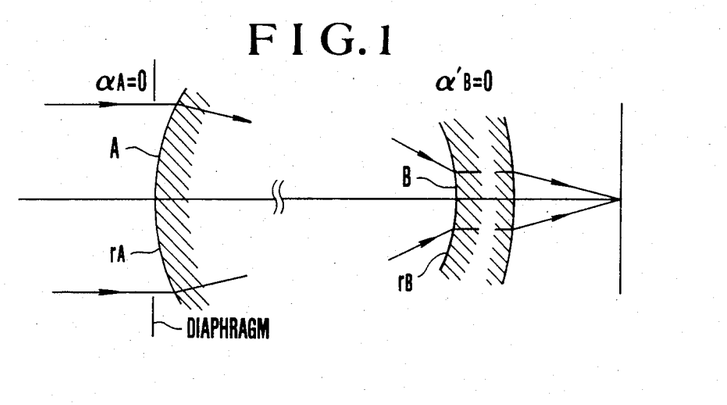
FIG. 1 is a diagram of geometry to explain the function of correcting aberrations.

In the present invention, it is under prescribed conditions that the refractive powers of the front and rear parts of the image forming lens unit are strengthened to thereby achieve correction of all aberrations in good balance. This has previously been regarded as very difficult. How to find such conditions will next be theoretically described by using formulae of Matsui's "Lens Design" (Kyoritsu Publications Ltd.) Since the formulae for the aberrations are expressed in terms of the radius of curvature, for explicit values are obtained, let us take a case where as shown in FIG. 1, a principal ray incident on the surface A of forward convexity emerges as afocal from the surface B of forward concavity. In the general case, that is, where it is not afocal, it is easy to alter the condition for the radii of curvature to cancel the aberrations.

For the $\nu$-th surface, let us denote the 3rd-order spherical aberration coefficient by I$\nu$, comatic aberration coefficient by II$\nu$, the astigmatic aberration coefficient by III$\nu$, the Petzval coefficient by P$\nu$, the sagittal image surface curvature coefficient by IV$\nu$, and the distortional aberration coefficient by V$\nu$. The surfaces A and B of FIG. 1, in the instance of the zoom lenses according to the invention shown in FIGS. 3 to 6, respectively correspond to the front surface of the first lens counting from the front of the cemented form in the front part of the lens unit IV and the front surface of the last lens of the cemented form in the rear part. For the surfaces A and B, their radii of curvature are represented by $\gamma A$ and $\gamma B$ respectively, and their other parameters are represented by respective common symbols but with the subscriptions A and B respectively.

In general, when the $\nu$-th surface is spherical, and $h\nu Q\nu \neq 0$, all the above-stated aberration coefficients are calculated by the following equations:

$$\begin{aligned} I\nu &= h\nu^4 Q\nu^2 \Delta\nu \left(\frac{1}{N_S}\right) \\ II\nu &= J\nu \cdot I\nu \\ III\nu &= J\nu \cdot II\nu \\ IV\nu &= III\nu + P\nu \\ V\nu &= J\nu IV\nu \end{aligned} \quad (i)$$

where $$h\nu Q\nu = h\nu \frac{N\nu}{\gamma\nu} - a\nu = h\nu \frac{N'\nu}{\gamma\nu} - \bar{a}'\nu$$

$$\bar{h}\nu \bar{Q}\nu = \bar{h}\frac{N\nu}{\gamma\nu} - \bar{a}\nu = \bar{h}\nu \frac{N'\nu}{\gamma\nu} - \bar{a}'\nu$$

$$h\nu \Delta\nu\left(\frac{1}{N_S}\right) = \frac{a'\nu}{N_\nu^{\beta}} - \frac{a\nu}{N_\nu^2}$$

$$J\nu = \frac{\bar{h}\nu \bar{Q}\nu}{h\nu Q\nu}$$

The equations (i) imply that if the surfaces A and B are made to be a pair of surfaces related to each other as:

$$I_A \approx -I_B,\ P_A \approx -P_B,\ J_A \approx J_B$$

no matter how strong the surfaces A and B may be in curvature as they occur simultaneously, the surfaces A and B can function to cancel all of each other's aberrations I$\nu$, II$\nu$, III$\nu$, IV$\nu$ and V$\nu$. Additionally, when the surface A is arranged as the convergent surface at the front of the lens unit IV, and the surface B as the divergent surface at the rear of the lens unit IV, the tendency of the tele type is increased, thus making it possible to shorten the total length while maintaining the residual aberrations at a minimum.

For the afocal rays arriving at the convergent surface A and leaving the divergent surface B as shown in FIG. 1, the equations for the spherical aberration coefficient I and the J are greatly simplified as follows:

$$I_A = h_A^2 \frac{(N_A - 1)}{\gamma_A^3 N_A^2},\ I_B = h_B^4 \frac{N_B^2(N_B - 1)}{\gamma_B^3} \quad (ii)$$

$$J_A = -\frac{\gamma_A \bar{a}_A}{h_A},\ J_B = \frac{h_B \bar{h}_B N_B - \gamma_B h_A \bar{a}_A}{h_B^2 N_B} \quad (iii)$$

To cancel out the spherical aberrations, the equations (ii) give $$\left(\frac{\gamma_B}{\gamma_A}\right)^3 = \frac{(N_B - 1)N_A^2 N_B^2}{(N_A - 1)}\left(\frac{h_B}{h_A}\right)^4 \quad (iv)$$

Meanwhile, with the spherical aberrations cancelled, to then cancel out the other aberrations, from the equations (iii), $$\bar{h}_B = \frac{\bar{a}_A \gamma_A}{\left(\frac{h_B}{h_A}\right)} \cdot \left\{ \left(\frac{\gamma_B}{\gamma_A}\right) - \left(\frac{h_B}{h_A}\right) \cdot N_B \right\} \quad \text{(v)}$$

must be established. Taking $$K = \frac{\gamma_A}{\left(\frac{h_B}{h_A}\right)} \cdot \left\{ \left(\frac{\gamma_B}{\gamma_A}\right) - \left(\frac{h_B}{h_A}\right) N_B \right\}$$

the equation (v) becomes $$h_B = K \cdot a_A \quad \text{(vi)}$$

Figure 2:
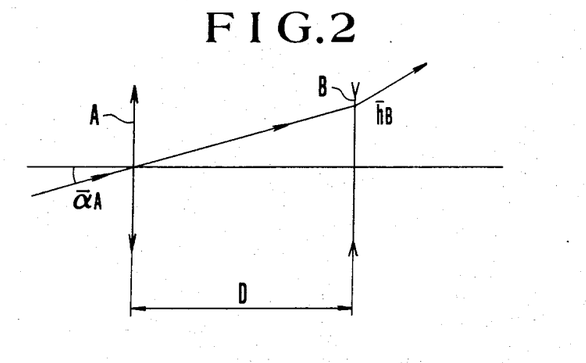
FIG. 2 is a diagram of a thin lens system graphically illustrating the effect on the aberration correction.

On the other hand, the principal ray advances from the surface A to the surface B while being refracted by the successive surface therebetween. But, as shown in FIG. 2, we can conclude at once that, using the air-reduced distance from the surface A to the surface B expressed by $$D = \sum_A^B d_i/n_i',$$

a general equation may be expressed as:

$$h_B \approx D a_A \quad \text{(vii)}$$

By comparing the equations (vi) and (vii), the value of the K may be regarded as almost equal to the air-reduced distance D from the surface A to the surface B.

From the equations (iv) and (v), it is to be understood that for the spherical aberrations to be cancelled out, and further for the other aberrations to be cancelled out, all that is needed is to make appropriate the relationship between $\gamma_A$ and $\gamma_B$, and the distance from the surface A to the surface B. If the values of $\gamma_A$ and $\gamma_B$ are related to each other by the formula (iv), not only the spherical aberrations but also the comas and the astigmatisms are perfectly cancelled out with each other, and the distortions are also almost cancelled out. In actual practice, the equations (iv) and (v) are not necessarily rigorously established in the equality, and if the aberrations for the surfaces A and B are cancelled out to some extent, the residual aberrations can be corrected by the suitable design of the other surfaces.

Even in the 5th-order aberration theory, there are relationships:

$$\overset{*}{II}v + \overset{*}{II}_{Zv} = Jv\overset{*}{Iv}$$

$$I_{Fv} + I_{Zv} = Jv\overset{*}{II}v$$

$$II_{pv} = JvI_{Fv}$$

$$IIv + II_{Zv} = JvIv$$

$$III = JvIIv$$

$$Vv = IVv$$

("The reseach on the practical use of the 5th-order aberration theory" by Yoshiya Matsui, Canon Research Report No. 2, page 43, 1963.)

It is, therefore, under the condition that the spherical aberrations are cancelled out, and the $J_A$ and $J_B$ have the same value, that the 5th-order aberrations are also almost cancelled out. For this reason, it is of great importance that the $Jv$'s for one pair of refracting surfaces have the same value.

In another case where the incident light on the surface A and the emerging light from the surface B are not afocal, it is only required to slightly shift the limits for the radius of curvature from the above-defined values for the above-stated principles to be applicable. In more detail, for the convergent ray incident on the surface A, the curvature of the surface B has to be made strong, and for the divergent ray, to be made weak, thereby forming a relationship for cancelling the aberrations. For the convergent ray emerging from the surface B, the curvature of the surface B has to be made weak, and for the divergent ray, to be made strong, thereby forming a relationship for cancelling the aberrations.

In the zoom lens according to the present invention, it is preferred that the image forming lens unit IV satisfies the following additional conditions:

(5) $1.5/\text{Fim} < \phi\text{imf} < 3.5/\text{Fim}$ (6) $1.5/\text{Fim} < |\phi\text{imr}| < 3.5/\text{Fim}, \phi\text{imr} < 0$ where $\phi\text{imf}$ and $\phi\text{imr}$ respectively represent the refractive powers of the front and rear parts of the image forming lens unit IV.

Further, in the zoom lens according to the present invention, it is desirable that the front part of the image forming lens unit IV is included with a meniscus cemented lens of weak power, with its cemented surface convex toward the front having a small radii of curvature Rx which lies in the following range:

(7) $0.05\text{Fim} < \text{Rx} < 0.2\text{Fim}$

Furthermore, it is desirable to satisfy the following conditions:

(8) $1.4 < N_P < 1.6$ (9) $1.7 < Nn < 1.9$ where Np is the mean refractive index of the positive lenses of the image forming lens unit, and Nn is the mean refractive index of the negative lenses of the same unit.

Further, in the zoom lens according to the present invention, the lens containing the above-identified divergent surface B arranged in the rear part of the image forming lens unit IV is in the form of a cemented lens, whereby the difference between the refractive indices of the lens elements constituting that cemented lens is taken at a value lying between 0.15 and 0.3 to correct field curvature and distortion. Also, the lens containing the above-identified convergent surface A, too, may be formed as a cemented lens, whereby a further improvement of correction of field curvature and distortion can be attained.

The significance of each of conditions (5) to (9) will next be described.

Conditions (5) and (6) correct the aberrations for higher image quality, while still maintaining the total length of the image forming lens unit IV at a minimum. When the upper limits are exceeded, a higher state of aberration correction is no longer expected, although the total length is reduced. When the lower limits are exceeded, the total length is increased, although the aberrations are well corrected.

Conditions (7), (8) and (9) further improve the field curvature, as it tends to be over-corrected when the total length is reduced. Either when the mean refractive index Np of the positive lenses in the image forming lens unit exceeds the upper limit of condition (8), or when the mean refractive index Nn of the negative lenses in the same unit exceeds the lower limit of condition (9), sufficient correction of field curvature becomes impossible to perform. For the purpose of correcting field curvature, the front part of the image forming lens unit IV is provided with a meniscus cemented lens. Condition (7) concerns the cemented surface of this meniscus lens. When its upper limit is exceeded, the curvature is too weak, and sufficient correction of field curvature becomes impossible. When the lower limit is exceeded, the cemented surface produces higher order spherical aberrations which cannot be corrected. Also when the lower limit of condition (8) or the upper limit of condition (9) is exceeded, the refractive index difference at the cemented surface becomes too large, causing other aberrations, for example, spherical aberration to be objectionably increased.

The zoom lens according to the present invention may be either of the type in which the positive lens unit I is stationary during zooming, or of the type in which it moves. Also the lens unit IV may be either stationary or movable when zooming. Specific examples of the zoom lens according to the invention are shown below.

Figure 3:
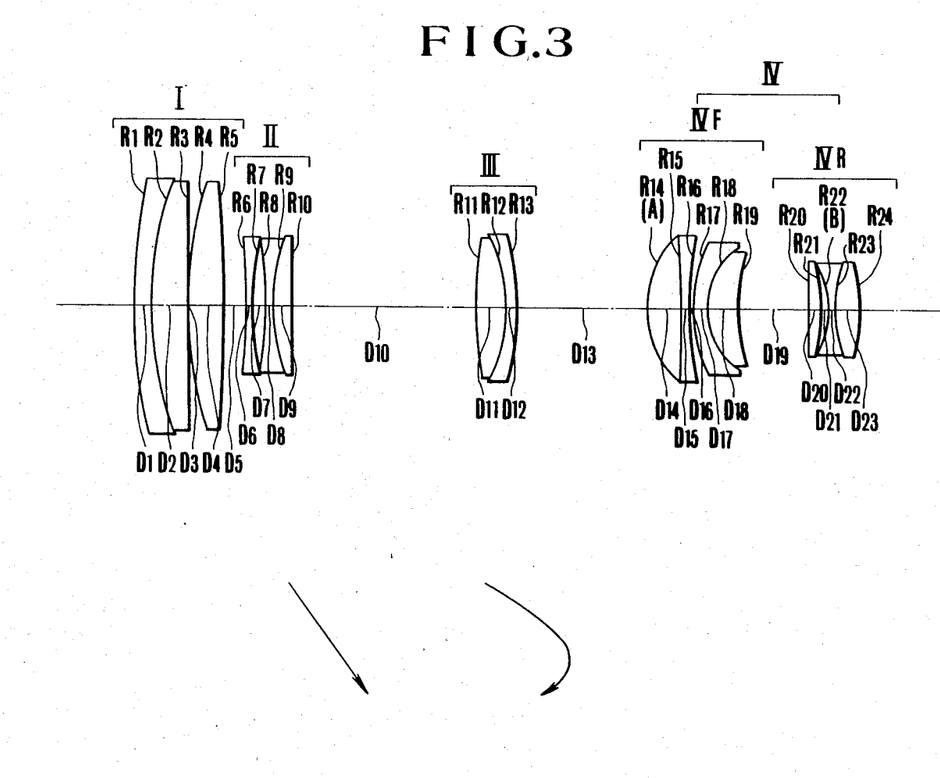
FIG. 3 is a longitudinal section view of Example 1 of a specific zoom lens of the invention.
Figure 7A:
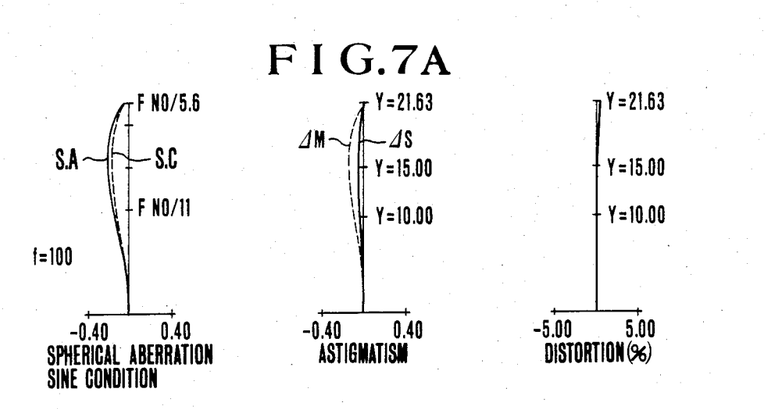
FIGS. 7A, 7B and 7C are graphic representations of the aberrations of the zoom lens of FIG. 3.
Figure 7B:
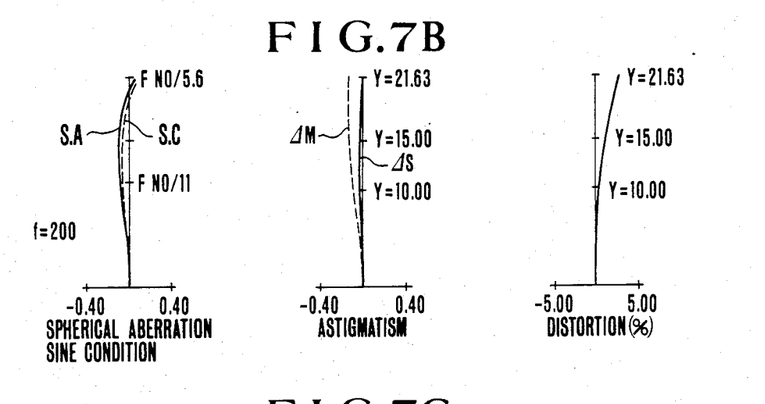
Figure 7C:
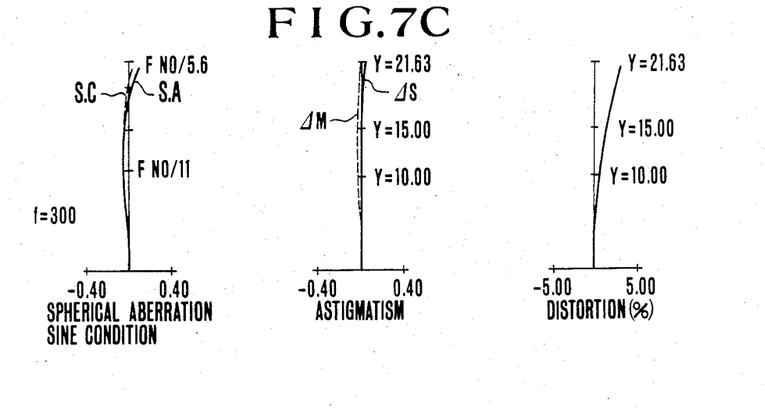

FIG. 3 is a lens block diagram of a first example of a specific zoom lens according to the invention. The zoom lens shown in FIG. 3 is constructed with a positive lens unit I (R1–R5) movable for focusing but stationary during zooming, a negative lens unit II (R6–R10) movable for zooming to function as a variator; a positive lens unit III (R11–R13) movable for zooming to function as a compensator, and a positive lens unit IV (R14–R24) which is stationary during zooming and focusing. The lens unit IV is divided into a positive front part (R14–R19) and a negative rear part (R20–R24), where the surfaces R14 and R22 correspond respectively to the surfaces A and B shown in FIG. 1. The front part consists of a positive doublet whose front surface R14 is convex toward the front and has its largest converging action in the front part, and a meniscus-shaped doublet of weak refractive power with its cemented surface R18 of strong curvature convex toward the front. The rear part consists of, from front to rear, a bi-convex singlet and a meniscus-shaped negative doublet with its front surface R22 having its strongest diverging action in the rear part. When zooming from the wide angle to the telephoto position, the lens unit II moves monotonically rearward, and the lens unit III moves first rearward then forward. The numerical data of the first specific example are shown in Table 1 below. F is the focal length of the entire system. $F_{NO}$ is the F-number. $2\delta$ is the image angle. Ri is the radius of curvature of the i-th surface counting from the front. Di is the axial thickness or axial air separation between the i-th and (i+1)th surface. Ni is the refractive index of the i-th lens element counting from the front, and $vi$ is the Abbe number of the same element. The aberrations of the first specific zoom lens are shown in FIGS. 7A, 7B and 7C when in the operative positions for F=100, F=200 and F=300 respectively, where M stands for meridional surface, S stands for sagittal surface, and Y stands for image height.

TABLE 1

| $F = 100 \sim 300$ $F_{ND} = 1:5.6$ $2\omega = 24.4° \sim 8.25°$ | | | |
|---|---|---|---|
| R1 = 132.417 | D1 = 2.95 | N1 = 1.74950 | $v1$ = 35.3 |
| R2 = 67.277 | D2 = 7.86 | N2 = 1.48749 | $v2$ = 70.1 |
| R3 = 1859.198 | D3 = 0.20 | | |
| R4 = 86.296 | D4 = 6.88 | N3 = 1.43387 | $v3$ = 95.1 |
| R5 = −475.658 | D5 = Variable | | |
| R6 = −178.429 | D6 = 1.47 | N4 = 1.69680 | $v4$ = 55.5 |
| R7 = 59.454 | D7 = 2.78 | | |
| R8 = −78.609 | D8 = 1.47 | N5 = 1.69680 | $v5$ = 55.5 |
| R9 = 41.786 | D9 = 3.54 | N6 = 1.84666 | $v6$ = 23.9 |
| R10 = 233.772 | D10 = Variable | | |
| R11 = 126.853 | D11 = 5.60 | N7 = 1.53375 | $v7$ = 55.5 |
| R12 = −34.309 | D12 = 2.36 | N8 = 1.80518 | $v8$ = 25.4 |
| R13 = −61.011 | D13 = Variable | | |
| R14 = 22.517 | D14 = 6.39 | N9 = 1.54739 | $v9$ = 53.6 |
| R15 = −309.651 | D15 = 1.47 | N10 = 1.77250 | $v10$ = 49.6 |
| R16 = 74.975 | D16 = 1.08 | | |
| R17 = 32.590 | D17 = 2.46 | N11 = 1.83400 | $v11$ = 37.2 |
| R18 = 14.974 | D18 = 6.39 | N12 = 1.60311 | $v12$ = 60.7 |
| R19 = 47.289 | D19 = 13.57 | | |
| R20 = 188.208 | D20 = 2.46 | N13 = 1.56732 | $v13$ = 42.8 |
| R21 = −50.767 | D21 = 1.31 | | |
| R22 = −19.742 | D22 = 1.47 | N14 = 1.77250 | $v14$ = 49.6 |
| R23 = 28.735 | D23 = 4.42 | N15 = 1.59270 | $v15$ = 35.3 |
| R24 = −52.809 | | | |

| | f = 100 | f = 200 | f = 300 |
|---|---|---|---|
| D5 | 4.8981 | 46.2258 | 59.9983 |
| D12 | 38.3929 | 19.2287 | 0.0678 |
| D13 | 26.6852 | 4.5217 | 9.9101 |

The optical total length: 219.27
The focal length $f_{IV}$ of lens unit IV (Image forming lens unit): 161.196
The distance from the front vertex of unit IV to the image plane/$f_{IV}$ = 0.709

| | 3rd-Order Aberration Coefficients (f = 100) | | | | | |
|---|---|---|---|---|---|---|
| | L | T | I | II | III | P | V |
| 1 | 0.01188 | 0.00818 | 0.1055 | 0.0727 | 0.0501 | 0.3235 | 0.2574 |
| 2 | −0.01995 | 0.00231 | −0.4138 | 0.0479 | −0.0056 | −0.1497 | 0.0180 |

TABLE 1-continued

|  | | | | | | | |
|---|---|---|---|---|---|---|---|
|  | 3 | 0.00057 | −0.00603 | 0.0007 | −0.0079 | 0.0831 | −0.0176 | −0.6929 |
|  | 4 | 0.00377 | 0.00180 | 0.1516 | 0.0723 | 0.0345 | 0.3506 | 0.1837 |
|  | 5 | 0.00348 | −0.00569 | 0.3471 | −0.5686 | 0.9314 | 0.0636 | −1.6298 |
|  | 6 | −0.01043 | 0.01389 | −0.8557 | 1.1399 | −1.5185 | −0.2302 | 2.3293 |
|  | 7 | −0.01851 | −0.00095 | −3.6832 | −0.1892 | −0.0097 | −0.6907 | −0.0360 |
|  | 8 | −0.00420 | 0.01088 | 0.0370 | −0.0959 | 0.2488 | −0.5224 | 0.7095 |
|  | 9 | 0.08244 | −0.01665 | 4.8666 | −0.9827 | 0.1985 | 0.1145 | −0.0632 |
|  | 10 | −0.04775 | −0.00741 | −4.2768 | −0.6638 | −0.1030 | −0.1961 | −0.0464 |
|  | 11 | 0.03327 | 0.00372 | 13.5040 | 1.5098 | 0.1688 | 0.2743 | 0.0495 |
|  | 12 | −0.15102 | 0.03171 | −17.1041 | 3.5912 | −0.7540 | −0.2857 | 0.2183 |
|  | 13 | 0.09862 | −0.03335 | 7.3236 | −2.4767 | 0.8376 | 0.7311 | −0.5305 |
|  | 14 | 0.09529 | 0.00828 | 134.4934 | 11.6840 | 1.0150 | 1.5711 | 0.2247 |
|  | 15 | −0.01803 | 0.00236 | −13.1638 | 1.7263 | −0.2264 | −0.0265 | 0.0332 |
|  | 16 | 0.00715 | −0.01081 | 0.3412 | −0.5159 | 0.7801 | −0.5813 | −0.3006 |
|  | 17 | 0.04189 | 0.01683 | −3.0372 | −1.2202 | −0.4902 | 1.3953 | 0.3636 |
| Lens | 18 | −0.10700 | −0.01173 | −33.1302 | −3.6312 | −0.3980 | −0.5244 | −0.1011 |
| Unit | 19 | −0.00032 | −0.00768 | 0.0013 | 0.0323 | 0.7806 | −0.7956 | −0.3625 |
| IV | 20 | −0.01762 | 0.00721 | −4.2776 | 1.7513 | −0.7170 | 0.1923 | 0.2148 |
|  | 21 | 0.04327 | −0.00099 | 50.2999 | −1.1516 | 0.0264 | 0.7130 | −0.0169 |
|  | 22 | −0.05934 | −0.00379 | −131.9200 | −8.4259 | −0.5382 | −2.2076 | −0.1754 |
|  | 23 | 0.00792 | 0.00485 | −1.4921 | −0.9129 | −0.5585 | −0.2216 | −0.4773 |
|  | 24 | 0.02393 | −0.00617 | 3.8666 | −0.9971 | 0.2571 | 0.7047 | −0.2480 |
| TOTAL | | −0.00069 | 0.00078 | 1.9842 | −0.2120 | 0.0929 | −0.0154 | −0.0787 |

Figure 4:
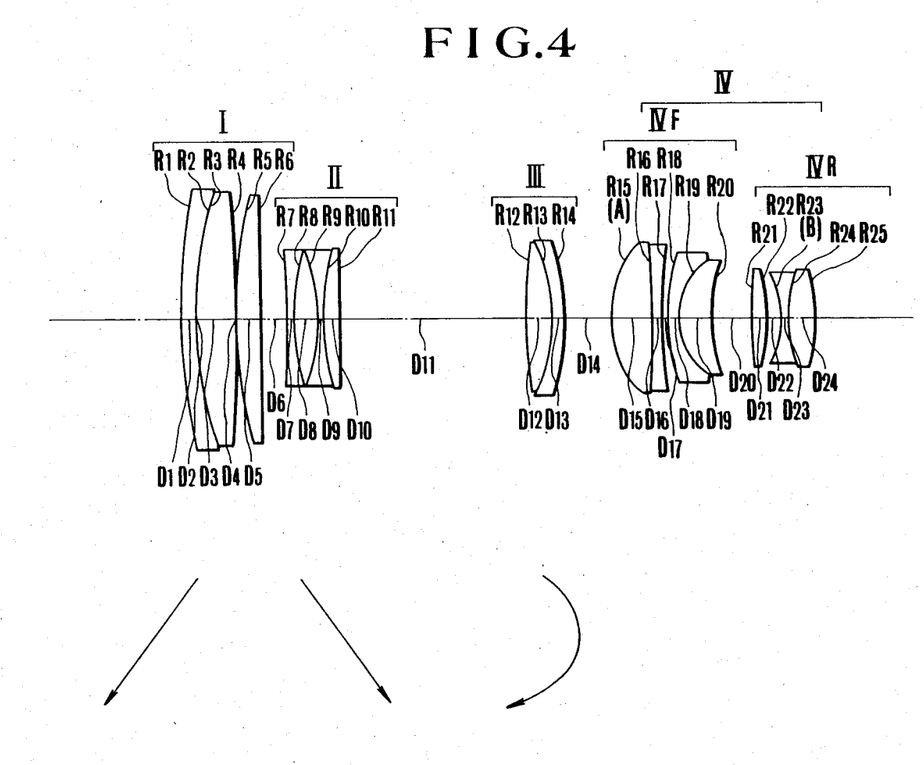
FIG. 4 is a longitudinal section view of Example 2 of a specific lens of the invention.
Figure 8A:
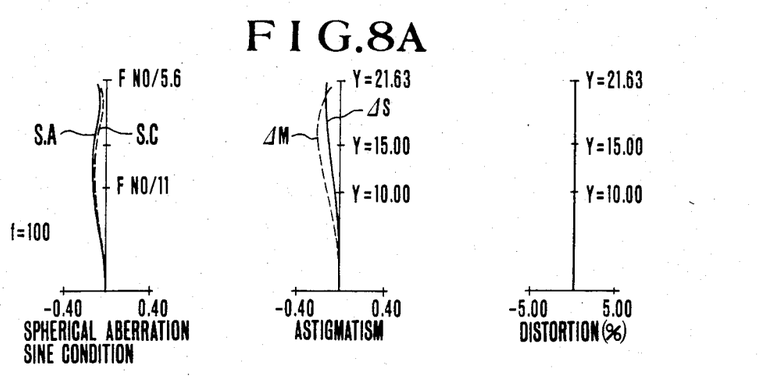
FIGS. 8A, 8B and 8C are graphic representations of the aberrations of the lens of FIG. 4.
Figure 8B:
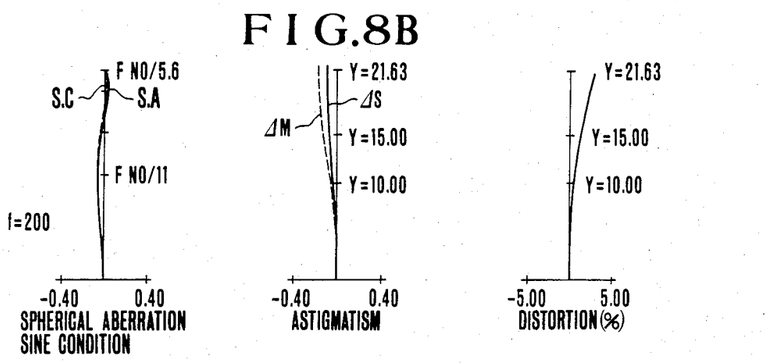
Figure 8C:
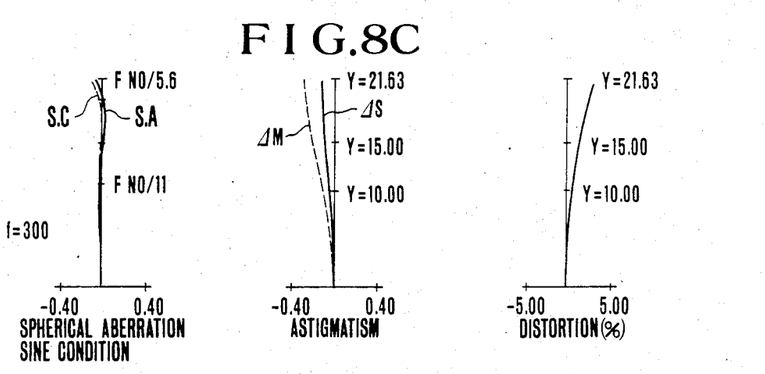

FIG. 4 in a lens block diagram illustrates a second example of a specific zoom lens according to the invention. When zooming from the wide angle to the telephoto position, the positive lens unit I (R1–R5) and the negative lens unit II (R6–R10) axially move away from each other at the same speed, while the positive lens unit III (R11–R13) moves first rearward and then forward. The positive lens unit IV remains stationary during zooming and is similar in construction to that of the first example. In the lens unit IV, the surfaces R15 and R23 correspond respectively to the surfaces A and B. The numerical data for the second example are listed in Table 2, and its aberrations are shown in FIGS. 8A, 8B and 8C for F=100, F=200 and F=300 respectively.

TABLE 2

$F = 100 \sim 300 \quad F_{ND} = 1:5.6 \quad 2\omega = 24.4° \sim 8.25°$

| R1 = 138.367 | D1 = 2.95 | N1 = 1.76182 | ν1 = 26.6 |
|---|---|---|---|
| R2 = 89.272 | D2 = 0.04 | | |
| R3 = 87.827 | D3 = 7.86 | N2 = 1.43387 | ν2 = 95.1 |
| R4 = −377.237 | D4 = 0.20 | | |
| R5 = 105.007 | D5 = 4.92 | N3 = 1.48749 | ν3 = 70.1 |
| R6 = 1667.581 | D6 = Variable | | |
| R7 = −300.275 | D7 = 1.42 | N4 = 1.69680 | ν4 = 55.5 |
| R8 = 53.985 | D8 = 4.49 | | |
| R9 = −53.581 | D9 = 1.42 | N5 = 1.69680 | ν5 = 55.5 |
| R10 = 53.649 | D10 = 3.41 | N6 = 1.84666 | ν6 = 23.9 |
| R11 = −31457.102 | D11 = Variable | | |
| R12 = 102.463 | D12 = 5.36 | N7 = 1.51742 | ν7 = 52.4 |
| R13 = −32.436 | D13 = 2.26 | N8 = 1.80518 | ν8 = 25.4 |
| R14 = −58.526 | D14 = Variable | | |
| R15 = 23.486 | D15 = 7.86 | N9 = 1.55963 | ν9 = 61.2 |
| R16 = −271.472 | D16 = 1.97 | N10 = 1.77250 | ν10 = 49.6 |
| R17 = 91.173 | D17 = 1.18 | | |
| R18 = 35.431 | D18 = 2.46 | N11 = 1.83400 | ν11 = 37.2 |
| R19 = 14.363 | D19 = 6.68 | N12 = 1.60729 | ν12 = 49.2 |
| R20 = 43.732 | D20 = 7.85 | | |
| R21 = 260.534 | D21 = 2.69 | N13 = 1.57501 | ν13 = 41.5 |
| R22 = −42.597 | D22 = 2.93 | | |
| R23 = −21.314 | D23 = 1.62 | N14 = 1.81600 | ν14 = 46.6 |
| R24 = 28.523 | D24 = 4.85 | N15 = 1.59270 | ν15 = 35.3 |
| R25 = −48.082 | | | |

| | f = 100 | f = 200 | f = 300 |
|---|---|---|---|
| D6 | 5.5063 | 47.4063 | 61.2863 |
| D11 | 38.4072 | 20.8317 | 3.3863 |
| D14 | 10.0201 | 6.6455 | 17.1509 |

The optical total length: 208.42–236.31
The focal length $f_{IV}$: 176.304

TABLE 2-continued $F = 100 \sim 300 \quad F_{ND} = 1:5.6 \quad 2\omega = 24.4° \sim 8.25°$ The distance/$f_{IV}$ = 0.694

Figure 5:
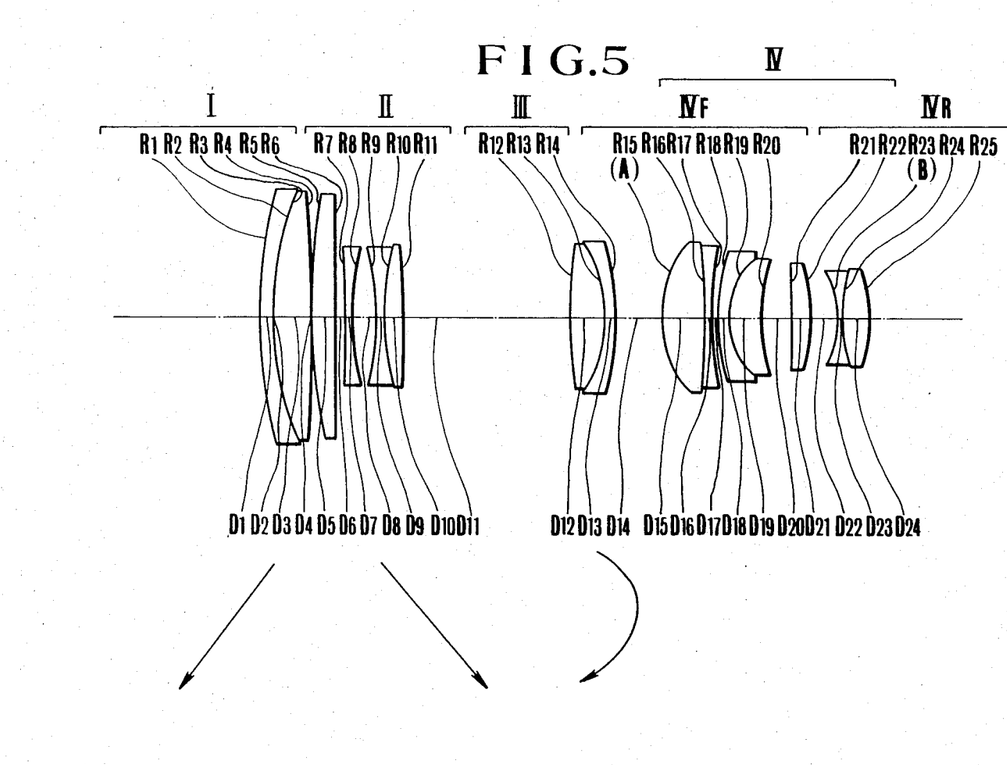
FIG. 5 is a longitudinal section view of Example 3 of a specific lens of the invention.
Figure 9A:
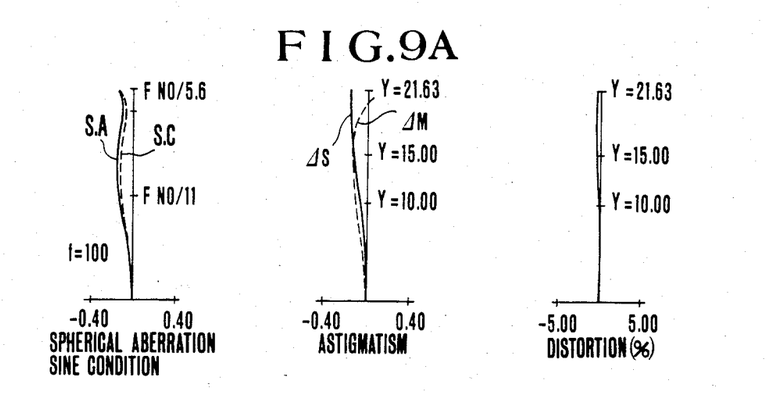
FIGS. 9A, 9B and 9C are graphic representations of the aberrations of the lens of FIG. 5.
Figure 9B:
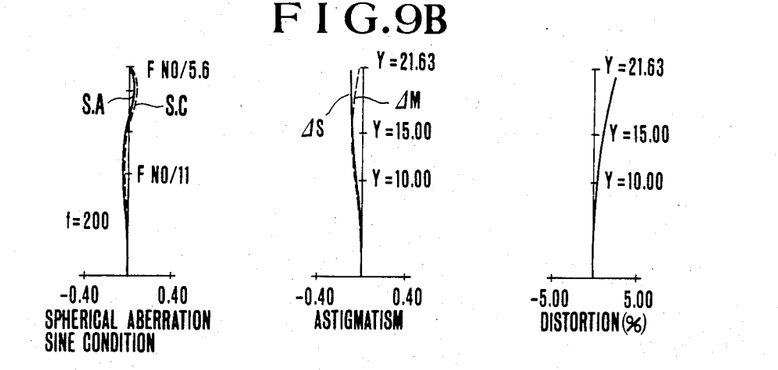
Figure 9C:
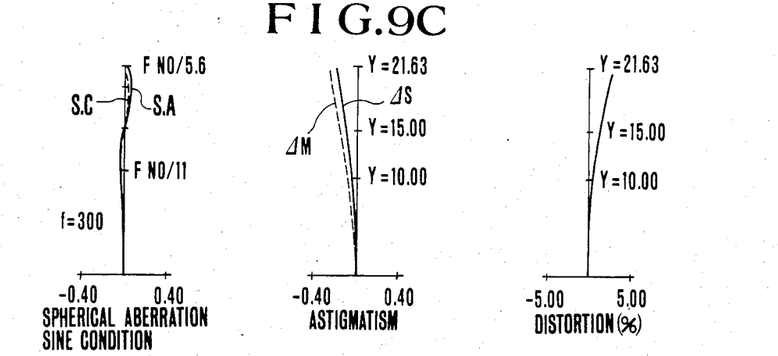

FIG. 5 in a lens block diagram illustrates a third example of a specific zoom lens according to the invention. This lens is of the same zoom type as that of the lens of FIG. 4, and can be constructed in accordance with the numerical data in Table 3 below. Its aberrations are shown in FIGS. 9A, 9B and 9C for F=100, F=200 and F=300.

TABLE 3

$F = 100 \sim 300 \quad F_{ND} = 1:5.6 \quad 2\omega = 24.4° \sim 8.25°$

| R1 = 103.274 | D1 = 2.95 | N1 = 1.80518 | ν1 = 25.4 |
|---|---|---|---|
| R2 = 73.480 | D2 = 0.10 | | |
| R3 = 73.480 | D3 = 7.27 | N2 = 1.43387 | ν2 = 95.1 |
| R4 = −985.588 | D4 = 0.20 | | |
| R5 = 122.662 | D5 = 4.91 | N3 = 1.51633 | ν3 = 64.1 |
| R6 = −3316.274 | D6 = Variable | | |
| R7 = −324.819 | D7 = 1.47 | N4 = 1.69680 | ν4 = 55.5 |
| R8 = 52.115 | D8 = 5.22 | | |
| R9 = −52.290 | D9 = 1.47 | N5 = 1.69680 | ν5 = 55.5 |
| R10 = 56.110 | D10 = 3.54 | N6 = 1.84666 | ν6 = 23.9 |
| R11 = −1062.402 | D11 = Variable | | |
| R12 = 99.604 | D12 = 6.88 | N7 = 1.49700 | ν7 = 81.6 |
| R13 = −30.221 | D13 = 2.36 | N8 = 1.83400 | ν8 = 37.2 |
| R14 = −51.344 | D14 = Variable | | |
| R15 = 24.228 | D15 = 8.36 | N9 = 1.60311 | ν9 = 60.7 |
| R16 = −238.298 | D16 = 1.47 | N10 = 1.77250 | ν10 = 49.6 |
| R17 = 73.152 | D17 = 1.18 | | |
| R18 = 42.215 | D18 = 2.06 | N11 = 1.83400 | ν11 = 37.2 |
| R19 = 15.544 | D19 = 6.68 | N12 = 1.60729 | ν12 = 49.2 |
| R20 = 55.473 | D20 = 5.75 | | |
| R21 = 425.219 | D21 = 3.44 | N13 = 1.57501 | ν13 = 41.5 |
| R22 = −48.214 | D22 = 5.48 | | |
| R23 = −21.253 | D23 = 0.98 | N14 = 1.81600 | ν14 = 46.6 |
| R24 = 29.054 | D24 = 4.91 | N15 = 1.62004 | ν15 = 36.3 |
| R25 = −40.380 | | | |

| | f = 100 | f = 200 | f = 300 |
|---|---|---|---|
| D6 | 2.1914 | 44.1000 | 57.9814 |
| D11 | 34.8926 | 17.3189 | 0.0500 |
| D14 | 9.6343 | 6.2537 | 16.7544 |

The optical total length: 205.82–233.72
The focal length $f_{IV}$: 176.007
The distance/$f_{IV}$ = 0.697

Figure 6:
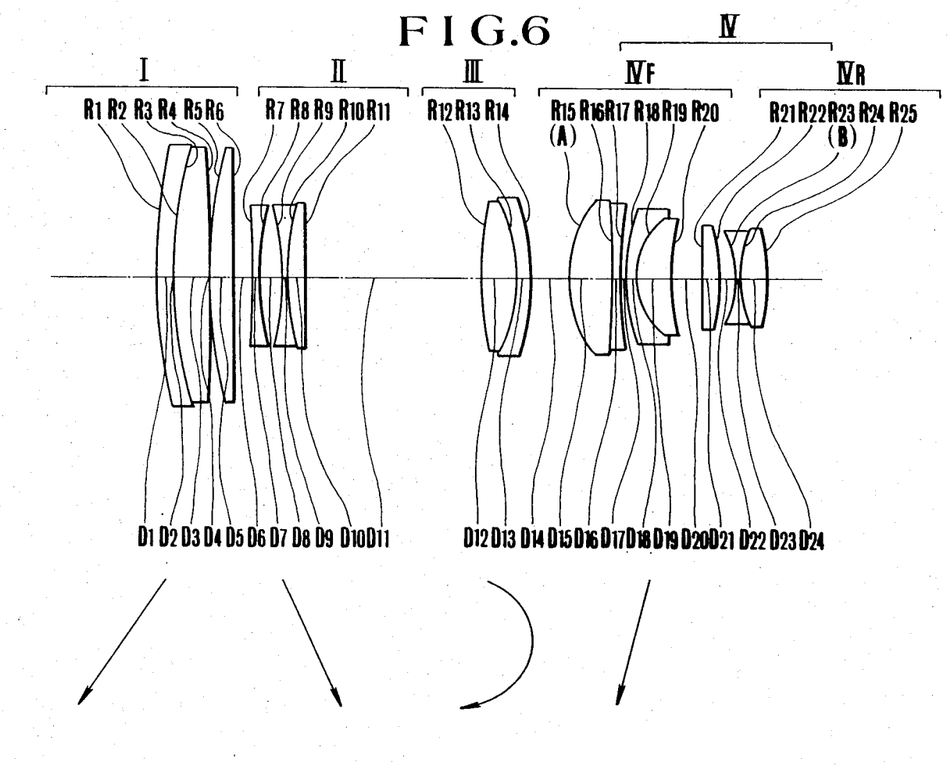
FIG. 6 is a longitudinal section view of Example 4 of a specific lens of the invention.
Figure 10A:
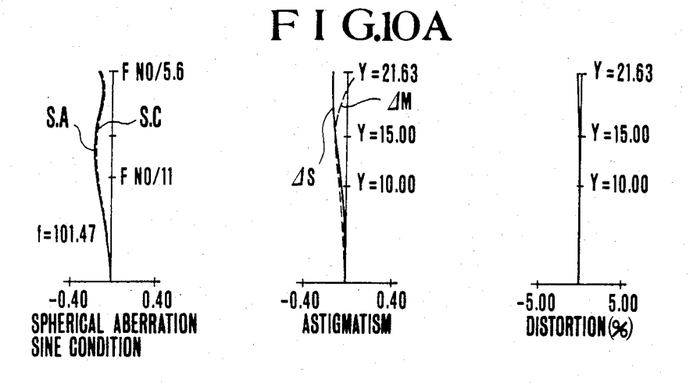
FIGS. 10A, 10B and 10C are graphic representations of the aberrations of the lens of FIG. 6.
Figure 10B:
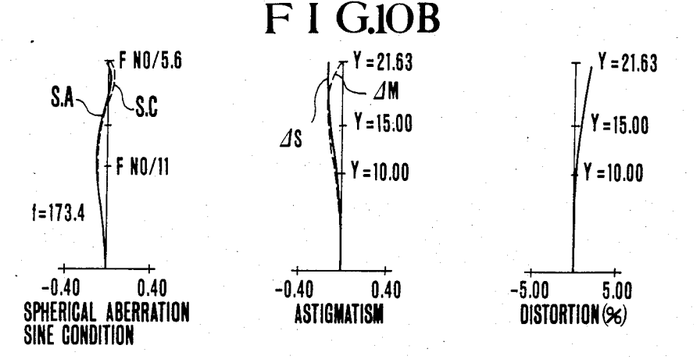
Figure 10C:
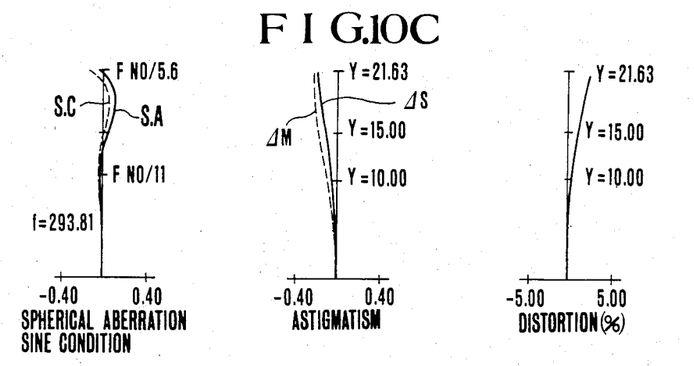

FIG. 6 in a lens block diagram illustrates a fourth example of a specific zoom lens according to the invention. When zooming from the wide angle to the telephoto position, the positive lens unit I (R1–R6) moves monotonically forward, the negative lens unit II (R7–R11) moves monotonically rearward, the positive lens unit III (R12–R14) moves first rearward and then forward, and the positive lens IV (R15–R25) moves monotonically forward. The lens unit IV is divided into a positive front part (R15–R20) and a negative rear part (R21–R25) where the surfaces R15 and R23 correspond respectively to the surfaces A and B of FIG. 1. The form of the lens unit IV is almost similar to that of the first example. Table 4 shows the numerical data for the fourth example. Its aberrations are shown in FIGS. 10A, 10B and 10C for F=101.47, F=173.4 and F=293.81 respectively.

TABLE 4

| F = 101.47~293.81 | $F_{ND}$ = 1:5.6 | 2ω = 24.1°~8.4° | |
|---|---|---|---|
| R1 = 143.204 | D1 = 3.00 | N1 = 1.80518 | ν1 = 25.4 |
| R2 = 86.643 | D2 = 0.11 | | |
| R3 = 86.669 | D3 = 7.40 | N2 = 1.48749 | ν2 = 70.1 |
| R4 = −974.788 | D4 = 0.20 | | |
| R5 = 106.094 | D5 = 5.00 | N3 = 1.48749 | ν3 = 70.1 |
| R6 = −1276.995 | D6 = Variable | | |
| R7 = −264.620 | D7 = 1.50 | N4 = 1.69680 | ν4 = 55.5 |
| R8 = 54.277 | D8 = 4.41 | | |
| R9 = −54.962 | D9 = 1.50 | N5 = 1.69680 | ν5 = 55.5 |
| R10 = 54.848 | D10 = 3.60 | N6 = 1.84666 | ν6 = 23.9 |
| R11 = −2218.045 | D11 = Variable | | |
| R12 = 108.210 | D12 = 7.13 | N7 = 1.52301 | ν7 = 50.8 |
| R13 = −31.252 | D13 = 2.40 | N8 = 1.80518 | ν8 = 25.4 |
| R14 = −56.890 | D14 = Variable | | |
| R15 = 24.943 | D15 = 8.50 | N9 = 1.60311 | ν9 = 60.7 |
| R16 = −258.779 | D16 = 1.50 | N10 = 1.77250 | ν10 = 49.6 |
| R17 = 88.017 | D17 = 1.20 | | |
| R18 = 39.231 | D18 = 2.10 | N11 = 1.83400 | ν11 = 37.2 |
| R19 = 15.533 | D19 = 6.80 | N12 = 1.61720 | ν12 = 54.0 |
| R20 = 42.791 | D20 = 5.87 | | |
| R21 = 160.177 | D21 = 3.50 | N13 = 1.59551 | ν13 = 39.2 |
| R22 = −41.022 | D22 = 3.13 | | |
| R23 = −23.061 | D23 = 1.00 | N14 = 1.81600 | ν14 = 46.6 |
| R24 = 24.016 | D24 = 5.00 | N15 = 1.59270 | ν15 = 35.3 |
| R25 = −59.675 | | | |

| | f = 101.47 | f = 173.4 | f = 293.81 |
|---|---|---|---|
| D6 | 3.6893 | 37.1073 | 57.5893 |
| D11 | 36.2034 | 23.5608 | 3.6916 |
| D14 | 12.1346 | 4.9682 | 12.6964 |

The optical total length: 211.57
The focal length $f_{IV}$: 178.57
The distance/$f_{IV}$ = 0.690

As has been described above, in the zoom lens according to the invention, despite strengthening of the refractive powers of the front and rear parts of the lens unit IV (relay lens) to shorten the lens system, the various aberrations can be corrected in good balance. Thus, the possibility of realizing a zoom lens of remarkably reduced total length as compared with the prior known zoom lenses is achieved.

What is claimed is:

1. A zoom lens comprising a zoom section including a plurality of lens units separated by air spaces, with at least one of the air spaces between two successive lens units being variable for zooming, and an image forming section of positive power arranged in rear of said zoom section and including a front lens unit of positive power and a rear lens unit of negative power, said image forming section satisfying the following conditions:

$$\frac{3.5}{Fim} < \phi a < \frac{5}{Fim}$$

$$0.1\, Fim < D < 0.4\, Fim$$

where $\phi a$ is the refractive power of a convergent surface A convex toward the front and having a largest positive power in said front lens unit respectively, B is a divergent surface concave toward the front and having a largest negative power in said rear lens unit, D is the air-reduced axial distance from said convergent surface A to said divergent surface B, Fim is the focal length of said image forming section power of the entire system is taken as 1.

2. A zoom lens according to claim 1, wherein said image forming section satisfies the following conditions:

$$\frac{1.5}{Fim} < \phi imf < \frac{3.5}{Fim}$$

$$\frac{1.5}{Fim} < |\phi imr| < \frac{3.5}{Fim}, \phi imr < 0$$

where $\phi imf$ is the power of said front lens unit, and $\phi imr$ is the power of said rear lens unit.

3. A zoom lens according to claim 1, wherein said front lens unit includes a doublet lens having a cemented surface convex toward the front, and satisfies the following condition:

$$0.05 Fim < Rx < 0.2 Fim$$

where Rx is the radius of curvature of the cemented surface.

4. A zoom lens according to claim 1, wherein said image forming section includes a plurality of positive lenses and a plurality of negative lenses, and satisfies the following conditions:

$$1.4 < Np < 1.6$$

$$1.7 < Nn < 1.9$$

where Np is the mean value of the refractive indices of said positive lenses, and Nn is the mean value of the refractive indices of said negative lenses.

5. A zoom lens according to claim 1, wherein said divergent surface B is the cemented surface of a doublet lens.

6. A zoom lens according to claim 1, wherein said convergent surface A is the frontmost lens surface of said image forming section.

7. A zoom lens comprising a zoom section including a plurality of lens units separated by air spaces, with at least one of the air spaces between two successive lens units being variable for zooming, and an image forming section of positive power arranged in rear of said zoom section and including a front lens unit of positive power and a rear lens unit of negative power, said image forming section satisfying the following conditions:

$$\frac{3.5}{Fim} < \phi a < \frac{5}{Fim}$$

$$0.1\, Fim < D < 0.4\, Fim$$

where $\phi a$ is the refractive power of a convergent surface A convex toward the front and having a largest positive power in said front lens unit respectively, B is a divergent surface concave toward the front, D is the air-reduced axial distance from said convergent surface A to said divergent surface B, Fim is the focal length of said image forming section, power of the entire system is taken as 1; and wherein said image forming section satisfies the following conditions:

$$\frac{1.5}{Fim} < \phi imf < \frac{3.5}{Fim}$$

$$\frac{1.5}{Fim} < |\phi imr| < \frac{3.5}{Fim}, \phi imr < 0$$

wherein $\phi imf$ is the power of said front lens unit, and $\phi imr$ is the power of said rear lens unit.

8. A zoom lens according to claim 7, wherein said front lens unit includes a doublet lens having a cemented surface convex toward the front, and satisfies the following condition:

0.05Fim<Rx<0.2Fim where Rx is the radius of curvature of the cemented surface.

9. A zoom lens according to claim 7, wherein said image forming section includes a plurality of positive lenses and a plurality of negative lenses and satisfies the following conditions:

1.4<Np<1.6

1.7<Nn<1.9 where Np is the mean value of the refractive indices of said positive lenses, and Nn is the mean value of the refractive indices of said negative lenses.

10. A zoom lens according to claim 7, wherein said divergent surface B is the cemented surface of a doublet lens.

11. A zoom lens according to claim 7, wherein said convergent surface A is the frontmost surface of said image forming section.

12. A zoom lens comprising a zoom section including a plurality of lens units separated by air spaces, with at least one of the air spaces between two successive lens units being variable for zooming, and an image forming section of positive power arranged in rear of said zoom section and including a front lens unit of positive power and a rear lens unit of negative power, said image forming section satisfying the following conditions:

$$\frac{3.5}{Fim} < \phi a < \frac{5}{Fim}$$

0.1 Fim < D < 0.4 Fim where $\phi a$ is the refractive power of a convergent surface A convex toward the front and having a largest positive power in said front lens unit respectively, B is a divergent surface concave toward the front, D is the air-reduced axial distance from said convergent surface A to said divergent surface B, Fim is the focal length of said image forming section, power of the entire system is taken as 1;

wherein said image forming section satisfies the following conditions:

$$\frac{1.5}{Fim} < \phi imf < \frac{3.5}{Fim}$$

$$\frac{1.5}{Fim} < |\phi imr| < \frac{3.5}{Fim}, \phi imr < 0$$

wherein $\phi imf$ is the power of said front lens unit, and $\phi imr$ is the power of said rear lens unit;

wherein said front lens unit includes a doublet lens having a cemented surface convex toward the front, and satisfies the following condition:

0.05Fim<Rx<0.2Fim where Rx is the radius of curvature of the cemented surface; and wherein said image forming section includes a plurality of positive lenses and a plurality of negative lens, and satisfies the following conditions:

1.4<Np<1.6

1.7<Nn<1.9 where Np is the mean value of the refractive indices of said positive lenses, and Nn is the mean value of the refractive indices of said negative lenses.

13. A zoom lens according to claim 1, wherein said zoom lens satisfies the following condition:

$$0.6 < \left|\frac{Rb}{Ra}\right| < 1.0$$

where Ra represents the radius curvature of the convergent surface A and Rb represents the radius curvature of the divergent surface B.

* * * * *